Figures 1, 2, 3, 4, 5:
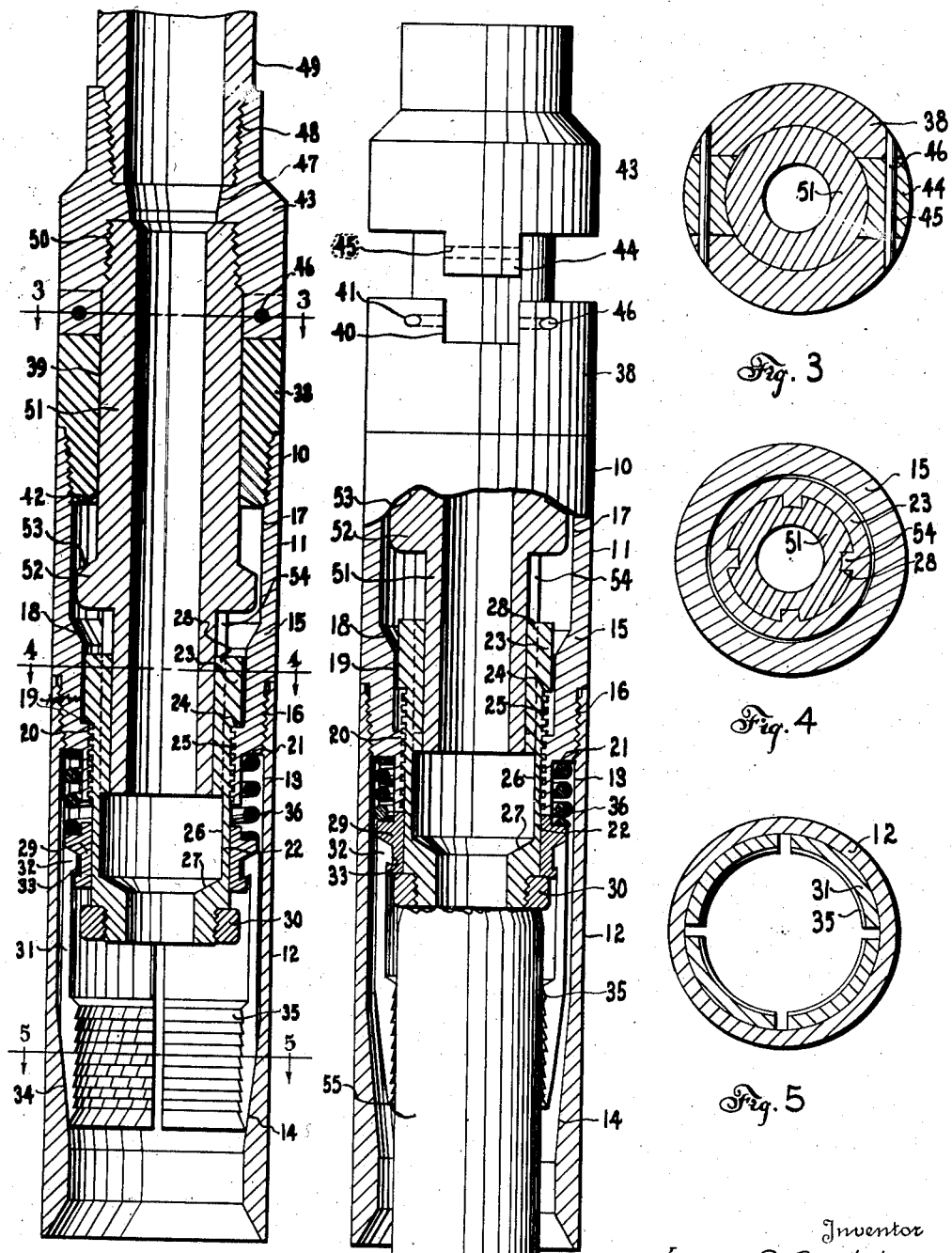

Jan. 26, 1943.  J. G. GRATEHOUSE  2,309,310
OVERSHOT
Filed Jan. 23, 1941

Inventor
James G. Gratehouse
By [signature]
Attorney

Patented Jan. 26, 1943

2,309,310

UNITED STATES PATENT OFFICE 2,309,310

OVERSHOT

James G. Gratehouse, Corpus Christi, Tex.

Application January 23, 1941, Serial No. 375,561

17 Claims. (Cl. 294—102)

This invention relates to new and useful improvements in an overshot, and is a continuation-in-part of my application filed February 20, 1939, Serial No. 257,279.

One object of the invention is to provide an improved overshot which is releasable, and which may be rotated without releasing.

An important object of the invention is to provide an improved overshot which readily engages the upper end of a pipe and which may be rotated without releasing, and is then capable of being released from the pipe.

Another object of the invention is to provide an improved overshot which is in engaging position and will readily pass over the upper end of a pipe, and having the engaging means in readiness at all times.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a vertical cross-sectional view of a device constructed in accordance with the invention, Figure 2 is a view, partly in section and partly in elevation, of the same device in its released position, Figure 3 is a horizontal cross-sectional view taken on the line 3—3 of Figure 1, Figure 4 is a horizontal cross-sectional view taken on the line 4—4 of Figure 1, and Figure 5 is a horizontal cross-sectional view taken on the line 5—5 of Figure 1.

In the drawing, the numeral 10 designates an overshot which has a sectional outer housing 11. A shoe 12 forms the lower portion of the housing 11, and is cylindrical in cross-section. The shoe 12 is provided with a bore 13 whose lower portion is flared inwardly so as to form a continuous, inwardly, upwardly and outwardly tapering surface 14. The upper end of the shoe 12 is internally screw-threaded and receives the lower end of a sleeve 15 which is provided with external screw threads 16. The sleeve 15 is provided with an axial bore 17 which is reduced near its central portion to form an inwardly tapering shoulder 18. Below the shoulder 18, the bore is further reduced to form another shoulder 19. The bore below the shoulder 19 is internally screw-threaded at 20, and below said shoulder and the threads 16, the outer surface of the sleeve is reduced so as to form a shoulder 21.

An elongate cage 22 is held by the screw-threaded portion 20 of the sleeve 15, and has an enlarged head 23. The outer surface of the cage 22 is reduced to form a shoulder 24, and below said shoulder the outer surface is screw-threaded so as to form screw threads 25 corresponding to the screw threads 20 of the sleeve 15. The cage 22 is provided with an axial bore 26 which is reduced at its lower end to form a downwardly sloping shoulder 27. A plurality of splines 28 are provided within the bore 26 near the upper end thereof. A collar 29 is slidably mounted on the cage, below the screw-threaded portion, and the lower end of the cage is reduced and receives a retaining nut 30 which confines the collar between the screw-threaded portion and the nut.

A plurality of enlarged fingers 31 depend from the collar 29. The upper ends of the fingers are provided with inwardly directed lugs 32 which fit within a recess 33 of the collar, and the fingers are confined within the recess by the shoe 12. The lower outer surfaces of said fingers are tapered inwardly at 34 so as to conform and lie upon the tapered surface 14 of the shoe 12. The lower portions of the inner surfaces of the fingers are provided with a plurality of elongated teeth 35 which, upon downward movement of the fingers, are forced inwardly by the tapered surfaces 34 and 14 so as to engage a pipe 55. Obviously as the pressure is increased on the fingers, the tighter they will grip the pipe.

A spring 36 is confined between the collar 29 and the shoulder 21 of the sleeve 15 so as to urge the collar and the fingers downwardly at all times. However, the spring does not exert enough downward pressure so as to move the lower portion of the fingers all the way into the tapered portion 14, but only enough so as to partially engage the surfaces 34 and 14.

A collar 38 is connected to the upper end of the sleeve 15, and is provided with an axial bore 39 extending therethrough. The upper periphery of the collar 38 is provided with recesses 40, and on either side of the recesses there are provided openings 41 which communicate with the interior of the recesses, and which are in axial alinement with one another. As will be seen in Figure 1, the lower portion of the collar 38 extends into the bore 17 of the sleeve 15, and the bore 39 of the collar 38 is considerably smaller than the bore of the sleeve so that the lower portion of the collar 38 forms an upwardly directed shoulder 42.

A cap member 43 rests upon the top of the collar 38, and is provided on its lower edge with a pair of depending lugs 44 which have openings 45 extending transversely therethrough so that when the lugs are placed within the recesses 40, the openings 45 are in alinement with the openings 41. Pins 46 may be inserted therethrough so as to lock the cap and the collar together. The cap 43 is provided with an axial bore 47 extending therethrough, and the upper portion of the bore is inwardly screw-threaded at 48 so that a pipe 49 may be attached thereto in order that the tool may be run into the well.

The bore 47, near its lower end, is enlarged and screw-threaded at 50 so as to receive an elongated, hollow mandrel 51 which extends through the collar 38. The mandrel below the collar is provided with an outwardly directed flange 52 whose upper surface is formed so as to provide an inwardly tapered shoulder 53 which will seat upon the shoulder 42 of the collar 38. The mandrel has a sliding fit within the bore 39 of the collar 38 so that the flange 52 extends outwardly beneath the lower end of the collar. Below the flange 52, the mandrel is provided with a plurality of splines 54 which mate with the splines 28 of the cage 22. Thus, when the tool is assembled, as shown in Figure 1, the splines 28 and the splines 54 of the mandrel 51 mate, so that when the mandrel is rotated in relation to the collar and sleeve and shoe of the device, the splines will rotate the cage in relation to these members.

In the operation of the device, the lugs 44 are locked within the recesses 40 of the collar 38 so that the device is run into the hole, as shown in Figure 1, by means of a running pipe 49. When the pipe 55, which is stuck within the well or which is to be retrieved from the well, is engaged, it will enter through the bore of the shoe 12 and force the fingers 31 upwardly against the tension of the spring 36. However, in many instances, it is necessary to rotate the overshot so as to pull the pipe away from the side of the well bore so that the shoe may telescope the upper end of the pipe. This can be accomplished with this tool because the cap 43 is locked in relation to the rest of the tool and therefore may be rotated until such time as the lugs 45 are removed from the recesses 40.

After the pipe has entered the shoe, an upward pull is exerted on the pipe 49 which will also move the overshot upwardly. The teeth 35 of the fingers 31 will bite into the pipe, and the outer housing 11 of the overshot will move upwardly, while the fingers will slide downwardly and bite further into the pipe due to the fact of the inwardly tapered surface 14 of the shoe 12. The upward pull is continued until the pins 46 shear, and when this occurs, the pipe 55 will be given a jar which oftentimes will be sufficient to release the pipe if it is stuck. In the event it does not release the pipe and the pipe cannot be removed, it is desirable then to release the overshot from the pipe. As set forth above, the lugs 44 have now been removed from the recesses 40 so that the mandrel 51 may be rotated while the rest of the housing is held stationary by the fingers 31 exerting a frictional hold upon the surface 14.

In order to release, the upward tension is slacked off from the pipe 49, and the fingers will move up to the position shown in Figure 1; but it is still impossible to remove the overshot from over the pipe. To accomplish this, the cap 43 is rotated, which in turn rotates the mandrel 51. The rest of the housing remains stationary and the splines 28 and 54 will impart rotation to the cage 22, and the threads of the cage and those of the sleeve will move the cage upwardly. The nut 30, on the lower end of the cage, will abut the collar 29. The teeth 35 of the fingers 31 are embedded within the pipe 55 and therefore cannot be moved upwardly; however, upon continued rotation, the outer housing 11 will move downwardly and the device will then be in its released position (Figure 2). At this time the overshot may be removed from the pipe as the fingers are not capable at this time of engaging the tapered surface 14 of the shoe 12. Thus, an overshot is had which may be rotated without the danger of being in a released position during or after rotation, but is still releasable.

Various changes, alterations and modifications may be made in the size, shape and arrangement of the herein described elements, within the scope of the appended claims.

What I claim and desire to secure by Letters Patent is:

1. A device for engaging and withdrawing a stuck object in a well bore including, a tubular body, grappling means movable within the body, means for rotating the device without the danger of releasing the same whereby it may be rotated before and after the stuck object has been engaged, releasable means whereby said device may be rotated and released when desired, and means for jarring the device.

2. A device for engaging and withdrawing a stuck object in a well bore including, a body, grappling means associated with the body, means for rotating the body without affecting a release of the grappling means, means for releasing said grappling means from the stuck object, and means for jarring the device.

3. A device for engaging and withdrawing a stuck object in a well bore including, a body, grappling means associated with the body, means for rotating the device, means for imparting a jarring action to the device, and rotative means for releasing the grappling means.

4. A device for engaging and withdrawing a stuck object in a well bore including, a body, grappling means associated with the body, means for rotating the device, means for imparting a jarring action to the device and the stuck object when the rotative means is released, and means for releasing the grappling means.

5. A device for engaging and withdrawing a stuck object in a well bore including, a tubular body, grappling means movable within the body, means for locking so that a rotation may be imparted to the body, means by an upward pull for severing the lock and for imparting a jarring action to the device, and means for releasing after a stuck object has been engaged.

6. A device for engaging and withdrawing a stuck object in a well bore including, a tubular body, grappling means movable within the body, means for locking so that a rotation may be imparted to the body, means by an upward pull for severing the lock and for imparting a jarring action to the device and the stuck object when the locking means is released, and means for releasing after a stuck object has been engaged.

7. A device for engaging and withdrawing a stuck object in a well bore including, a sectional tubular housing, grappling means movable within the housing, means for releasably locking two sections of the housing together so that rotation may be imparted to the same, means for imparting a jarring action to the device and the stuck object when the locking means is released, and means for releasing after a stuck object has been engaged.

8. A device for engaging and withdrawing a stuck object in a well bore including, a tubular body, grappling means movable within the body, means within the body for moving the grappling means inwardly into engagement with the stuck object and holding the same in such engagement, means for locking so that a rotation may be imparted to the body, means by an upward pull for severing the lock and for imparting a jarring action to the device, and means for releasing after a stuck object has been engaged.

9. A device for engaging and withdrawing a stuck object in a well bore including, a tubular body, grappling means movable within the body, means within the body for moving the grappling means inwardly into engagement with the stuck object and holding the same in such engagement, means for locking so that a rotation may be imparted to the body, means by an upward pull for severing the lock and for imparting a jarring action to the device and the stuck object when the locking means is released, and means for releasing after a stuck object has been engaged.

10. A device for engaging and withdrawing a stuck object in a well bore including, a sectional tubular housing, grappling means movable within the housing, means within the housing for moving the grappling means inwardly into engagement with the stuck object and holding the same in such engagement, means for releasably locking two sections of the housing together so that rotation may be imparted to the same, means for imparting a jarring action to the device and the stuck object when the locking means is released, and means for releasing after a stuck object has been engaged.

11. A device for engaging and withdrawing a stuck object from a well bore including, a body adapted to telescope said object and having an inside seat, grappling means movable into engaging position when upon the seat and into released position when removed from the seat, an operating string controlled from the top of the well, a clutch means disposed so as to lock the string and body together so that they may be rotated together, a yieldable means normally holding the clutch engaged, and means operatively connecting the string and the grappling means so as to move the grappling means into and out of engaging position after the clutch has been released.

12. A device for engaging and withdrawing a stuck object from a well bore including, a body adapted to telescope said object and having an inside seat, grappling means movable into engaging position when upon the seat and into released position when removed from the seat, an operating string controlled from the top of the well, a clutch means disposed so as to lock the string and body together so that they may be rotated together, a yieldable means normally holding the clutch engaged, means operatively connecting the string and the grappling means so as to move the grappling means into and out of engaging position after the clutch has been released, and means for holding the grappling means in its released position.

13. A device for engaging and withdrawing a stuck object in a well bore including, a body to telescope over said object and having an inside seat, grappling means movable to active position onto the seat and into inactive position off of the seat, said seat being shaped to cause the grappling means to engage the stuck object when in said active position and to permit the grappling means to release the stuck object when in said inactive position, an operating string having a longitudinal movement relative to the body, clutch means between the string and body for rotatably connecting the same and which is engaged and disengaged by said longitudinal movement, the body and string having opposing impact faces to contact upon said longitudinal movement to cause a jar and to prevent removal of the string from the body, means operatively connecting the string with the grappling means and effective to move said grappling means to released position upon disengagement of the clutch means and rotation of the string.

14. A device for engaging and withdrawing a stuck object in a well bore including, a tubular body having an inside seat, grappling means in the body movable into active position on the seat and into engagement with the stuck object and movable into inactive position to release said seat and object, an operating string having a liimted longitudinal movement relative to the body, clutch means between the string and body effective to cause the body to rotate with the string, said clutch being engaged and disengaged by said longitudinal movement, means connecting the grappling means to the body including a tubular jack having a threaded connection with the body, said string being longitudinally movable and rotatably immovable in the jack, the jack being thereby movable upon disengagement of the clutch and rotation of the string relative to the body to move the grappling means to either of said positions.

15. A device for engaging and withdrawing a stuck object in a well bore including, a body shaped to telescope over said object and having an inside seat, grappling means movable to active position onto the seat and into inactive position off of the seat, said seat being shaped to cause the grappling means to engage the stuck object when in said active position and to permit the grappling means to release the stuck object when in said inactive position, an operating string, said body and string having opposing impact faces to contact upon longitudinal movement of the string relative to the body to cause a jar, said impact faces being effective to prevent removal of the string from the body, means operatively connecting the string with the grappling means and effective to move said grappling means to released position upon rotation of the string relative to the body.

16. A device for engaging and withdrawing a stuck object in a well bore including, a tubular body, means for suspending the body in a well bore, grappling means movable within the body, clutch means between the suspending means and the body, said clutch means being adaptable when engaged to rotate the body and the grappling means and when disengaged to rotate the grappling means with respect to the body, and rotative means for releasing the grappling means.

17. A device for engaging and withdrawing a stuck object in a well bore as set forth in claim 16, and frangible means for locking said clutch means in an engaged position said frangible means being adapted to be fractured when it is desired to release the grappling means.

JAMES G. GRATEHOUSE.